United States Patent
Hwang

(10) Patent No.: US 11,523,389 B2
(45) Date of Patent: Dec. 6, 2022

(54) COMMUNICATION RESOURCE ALLOCATION METHOD IN SYNCHRONIZED WIRELESS DISTRIBUTED COMMUNICATION SYSTEM, AND APPARATUS THEREFOR

(71) Applicant: Electronics and Telecommunications Research Institute, Daejeon (KR)

(72) Inventor: Hyun Gu Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 166 days.

(21) Appl. No.: 17/033,112

(22) Filed: Sep. 25, 2020

(65) Prior Publication Data

US 2021/0099995 A1 Apr. 1, 2021

(30) Foreign Application Priority Data

Sep. 27, 2019 (KR) .................. 10-2019-0119395
Aug. 10, 2020 (KR) .................. 10-2020-0099673

(51) Int. Cl.
*H04J 11/00* (2006.01)
*H04W 72/04* (2009.01)
(Continued)

(52) U.S. Cl.
CPC ..... *H04W 72/0446* (2013.01); *H04J 11/0023* (2013.01); *H04W 40/16* (2013.01);
(Continued)

(58) Field of Classification Search
CPC ..... H04B 17/382; H04L 5/0035; H04L 47/74; H04J 11/0023; H04W 40/16; H04W 52/24
See application file for complete search history.

(56) References Cited

U.S. PATENT DOCUMENTS 9,844,085 B2 12/2017 Seo et al.
10,616,864 B2 4/2020 Sheng
(Continued)

FOREIGN PATENT DOCUMENTS

JP 2012175275 A 9/2012
KR 1020180058662 A 6/2018
(Continued)

*Primary Examiner* — Salvador E Rivas
(74) *Attorney, Agent, or Firm* — William Park & Associates Ltd.

(57) ABSTRACT

An operation method of a first distributed terminal, in a synchronized wireless distributed communication system which has a plurality of communication resources configured with a plurality of channels having different center frequencies and includes the first distributed terminal and a second distributed terminal, may comprise receiving slots mapped to the communication resources in a resource allocation channel having a center frequency independent from the plurality of channels; measuring communication environments of the communication resources by using a mapping relationship between the received slots of the resource allocation channel and the communication resources; selecting a first communication resource to be allocated using the measured communication environments of the communication resources; allocating the selected first communication resource; and continuously occupying the allocated first communication resource.

15 Claims, 16 Drawing Sheets

(51) Int. Cl.
  *H04W 72/08* (2009.01)
  *H04W 52/34* (2009.01)
  *H04W 40/16* (2009.01)
  *H04W 52/24* (2009.01)

(52) U.S. Cl.
  CPC ....... *H04W 52/346* (2013.01); *H04W 72/082*
  (2013.01); *H04W 52/24* (2013.01)

(56) References Cited

U.S. PATENT DOCUMENTS

| | | | |
|---|---|---|---|
| 2009/0199076 A1* | 8/2009 | Boer | H04L 1/1829 |
| | | | 714/799 |
| 2014/0192848 A1* | 7/2014 | Rao | H04L 5/00 |
| | | | 375/219 |
| 2017/0331670 A1 | 11/2017 | Parkvall et al. | |
| 2018/0198648 A1* | 7/2018 | Sun | H04L 25/03866 |
| 2018/0278380 A1* | 9/2018 | Kim | H04L 1/1854 |
| 2018/0332660 A1 | 11/2018 | Mueck et al. | |
| 2019/0007974 A1* | 1/2019 | Nguyen | H04W 4/44 |
| 2019/0182006 A1 | 6/2019 | Xiong et al. | |
| 2019/0261432 A1* | 8/2019 | Ke | H04W 40/244 |
| 2019/0387544 A1 | 12/2019 | Hwang | |
| 2020/0120642 A1 | 4/2020 | Hwang et al. | |
| 2021/0092717 A1* | 3/2021 | Takeda | H04W 72/042 |
| 2021/0160876 A1* | 5/2021 | Osawa | H04W 72/0446 |

FOREIGN PATENT DOCUMENTS

| | | | | |
|---|---|---|---|---|
| KR | 1020180058668 A | 6/2018 | | |
| KR | 1020190101304 A | 8/2019 | | |
| WO | 2019164328 A1 | 8/2019 | | |
| WO | WO-2021038264 A1 * | 3/2021 | ............ | H04W 48/08 |

* cited by examiner

FIG. 1C

| | | | | | | | | | | | | | |
|---|---|---|---|---|---|---|---|---|---|---|---|---|---|
| slot group 0 | #0 | #20 | #40 | #60 | #80 | #100 | #120 | #140 | #160 | #180 | #200 | #220 | ... | #460 | #480 |
| slot group 1 | #1 | #21 | #41 | #61 | #81 | #101 | #121 | #141 | #161 | #181 | #201 | #221 | ... | #461 | #481 |
| slot group 2 | #2 | #22 | #42 | #62 | #82 | #102 | #122 | #142 | #162 | #182 | #202 | #222 | ... | #462 | #482 |
| ... |
| slot group 19 | #19 | #39 | #59 | #79 | #99 | #119 | #139 | #159 | #179 | #199 | #219 | #239 | ... | #479 | #499 |

☐ control terminal → distributed terminal (drone)   ▨ distributed terminal (drone) → control terminal

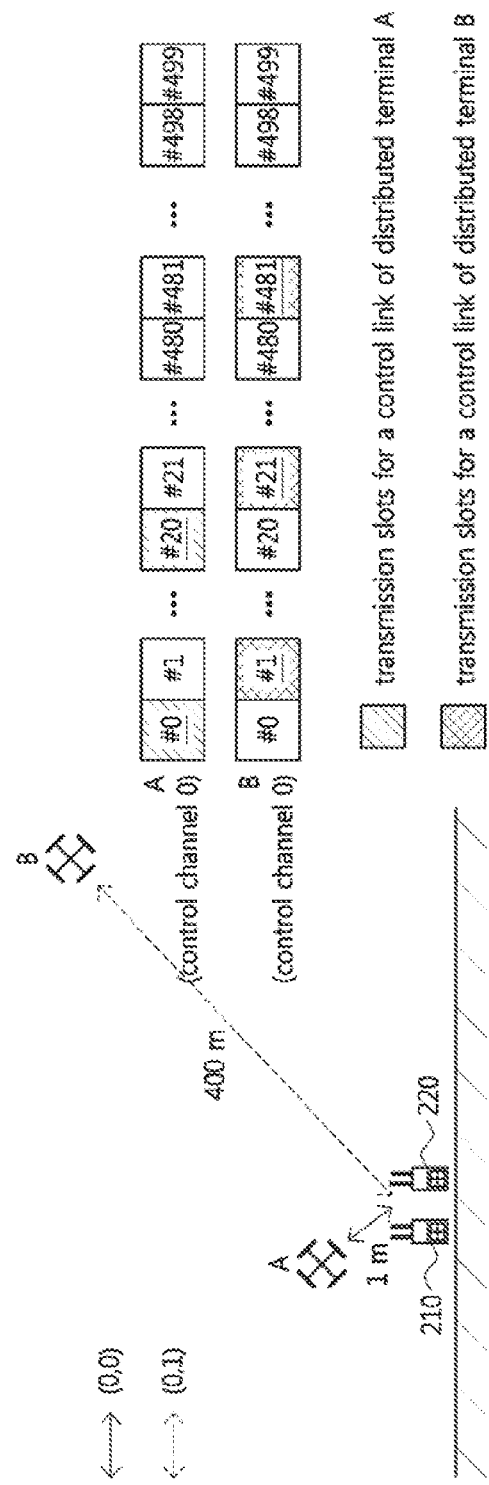

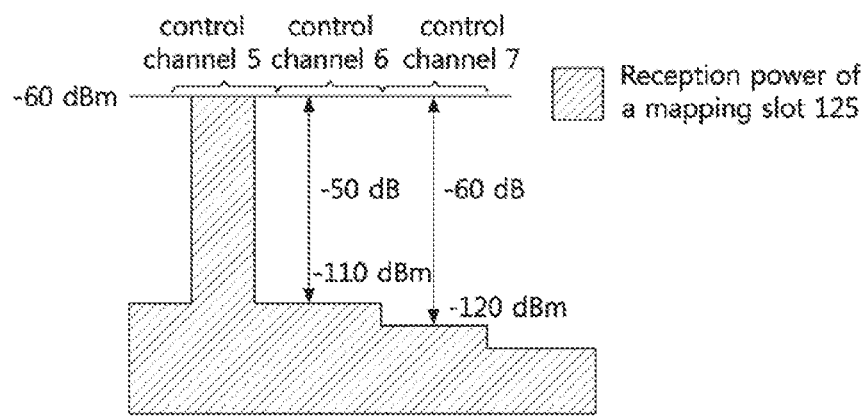

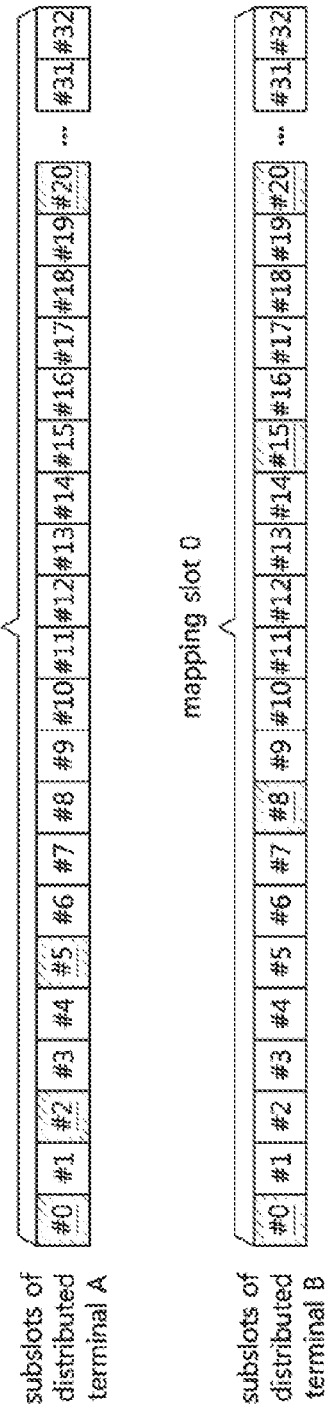
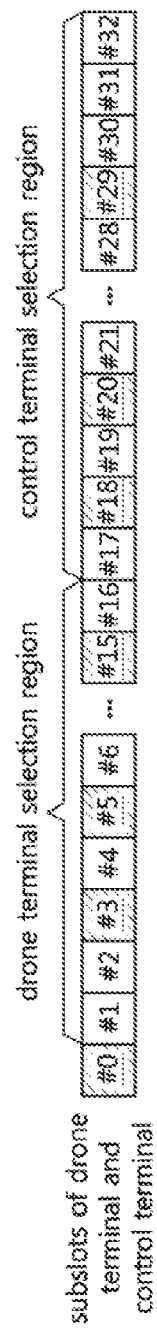
FIG. 10B
FIG. 10C

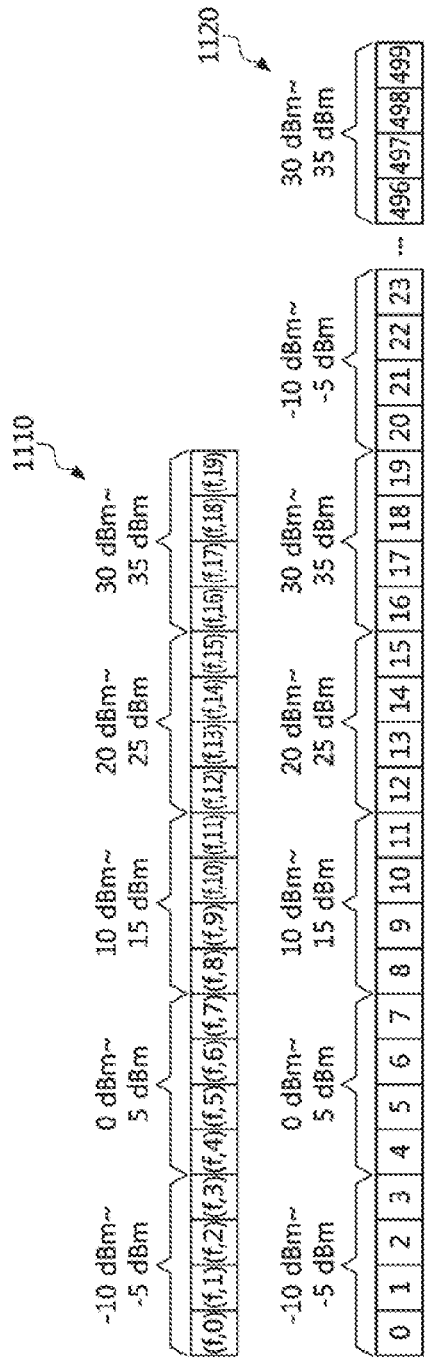

COMMUNICATION RESOURCE ALLOCATION METHOD IN SYNCHRONIZED WIRELESS DISTRIBUTED COMMUNICATION SYSTEM, AND APPARATUS THEREFOR

CROSS-REFERENCE TO RELATED APPLICATIONS

This application claims priority to Korean Patent Applications No. 10-2019-0119395 filed on Sep. 27, 2019, and No. 10-2020-0099673 filed on Aug. 10, 2020 with the Korean intellectual Property Office (KIPO), the entire contents of which are hereby incorporated by reference.

BACKGROUND

1. Technical Field

The present disclosure relates generally to a synchronized wireless distributed communication system, and more specifically, to a method for a distributed communication terminal to autonomously allocate a communication resource to use among communication resources configured with channels having different center frequencies while minimizing a resource collision without assistance of a control station in a synchronized wireless distributed communication system in which communication resources of channels having different center frequencies are configured, and an apparatus using the same.

2. Related Art

Commercialization of small drones is progressing rapidly. For example, Amazon has developed a delivery service using small drones, and Japan has also created a bill stating that construction surveys should be conducted with drones. Such the small drones are currently mainly controlled by a Wi-Fi communication scheme, and image data captured by the drones is also mainly transmitted and received through the Wi-Fi communication scheme.

However, there are various problems with the Wi-Fi communication scheme. First, since the current Wi-Fi communication uses an unlicensed band, if interference occurs in a Wi-Fi channel used by a drone and a controller (e.g., control terminal), communication may be disrupted. Second, since the Wi-Fi uses carrier sense multiple-access/collision avoidance (CSMA/CA) access technology as an asynchronous communication scheme, collision probability of communication resources is high. Due to the high probability of collision of communication resources, stability of the system is low, and thus the Wi-Fi communication scheme cannot support a large number of distributed terminals.

According to the above-described reasons, small drones may use mobile communication systems such as 3GPP long term evolution (LTE) and/or new radio (NR) in the future. However, the mobile communication system has a relatively long communication latency, and thus is not suitable for real-time control. In addition, since the mobile communication system has a problem that a drone cannot be controlled in a communication shadow area and a problem of disconnection in the communication shadow area, a situation in which communication with the drone is suddenly disconnected may pose a safety risk.

Due to these operational risks, countries around the world are currently imposing strict regulations on small drones. In other words, due to the regulations, commercial services such as drone delivery are difficult to realize or are provided only very limitedly. Therefore, there is a demand for communication dedicated to small drones to ensure operational stability of the small drones. Dedicated communications required are mainly drone control communications and mission communications. A control channel used for the control communication is a channel for the control terminal to control the drone, and a mission channel used for the mission communication is a channel that mainly delivers image data captured by the drone to the controller. Since many drones use the control channels, the control channels are composed of multi-channel resources with different center frequencies, and the same is for the case of the mission channels.

When a large number of distributed drones use dedicated control channels and dedicated mission channels, an important point is that communication resources should be stably allocated to each distributed drone without fear of communication resource collision. However, an agency that approves a flight permit for a small drone does not allocate in real time to the drone which channel resource to use among available multi-channel resources for the following reasons.

First, communication resource collisions do not occur when drones far apart from each other are allocated channels with the same frequency, but communication resource collisions may occur and communication may be disrupted when drones that are far apart from each other are approaching close while operating. Second, even when channel resources having different frequencies are used, communication disruption may occur due to a near-far problem. For example, even when a drone A and a drone B use channels with different frequencies, if a frequency gap between the two channels is not large enough, a. signal transmitted by the drone A may cause strong interference to the drone B and a control terminal related to the drone B. In this reason, the present disclosure proposes a method in which a large number of distributed drones can autonomously allocate multi-channel resources for control or mission in real time without resource collision.

SUMMARY

Accordingly, exemplary embodiments of the present disclosure are directed to providing a method for distributed terminals to autonomously select communication resources to use in real time in a synchronized wireless distributed communication system in which a plurality of communication resources configured with channels having different center frequencies exist.

Accordingly, exemplary embodiments of the present disclosure are also directed to providing a pair of distributed terminals, which autonomously select resources to use among a plurality of channel resources in a synchronized wireless distributed communication system.

Accordingly, exemplary embodiments of the present disclosure are also directed to providing a synchronized wireless distributed communication system composed of a distributed communication terminal for autonomously selecting a resource to use among a plurality of channel resources in real time, and a distributed control terminal for controlling the distributed communication terminal.

According to an exemplary embodiment of the present disclosure, operation method of a first distributed terminal, in a synchronized wireless distributed communication system which has a plurality of communication resources configured with a plurality of channels having different center frequencies and includes the first distributed terminal and a second distributed terminal, may comprise receiving slots mapped to the communication resources in a resource allocation channel having a center frequency independent from the plurality of channels; measuring communication environments of the communication resources by using a mapping relationship between the received slots of the resource allocation channel and the communication resources; selecting a first communication resource to be allocated using the measured communication environments of the communication resources; allocating the selected first communication resource; and continuously occupying the allocated first communication resource.

Each of the plurality of communication resources may be each of the plurality of channels having different center frequencies.

The plurality of communication resources may be a plurality of subchannels into Which the plurality of channels having different center frequencies are respectively divided, and the subchannels may be temporally separated in each frequency region.

Different transmission power ranges may be allocated to temporally separated subchannels among the plurality of communication resources.

Configuration information for the plurality of communication resources, configuration information for the resource allocation channel, and the mapping relationship between the plurality of communication resources and the slots of the resource allocation channel may be preconfigured to a plurality of distributed terminals including the first distributed terminal and the second distributed terminal.

The selecting of the first communication resource may comprise identifying unoccupied communication resources among the plurality of communication resources; calculating interference power for each of the unoccupied communication resources; and selecting the first communication resource based on the calculated interference power for each of the unoccupied communication resources.

In the identifying of the unoccupied communication resources, the unoccupied communication resources may be identified by comparing a received signal strength of a first-in-time subslot of each slot in the resource allocation channel, which is mapped to each of the plurality of communication resources, with a predetermined threshold.

In the calculating of the interference power, the interference power for each of the unoccupied communication resources may be calculated by summing interference powers which all communication resources having different frequencies from and temporally overlapping with the each of the unoccupied communication resources affect the each of the unoccupied communication resources.

The interference powers which all communication resources having different frequencies from and temporally overlapping with the each of the unoccupied communication resources affect the each of the unoccupied communication resources may be calculated by summing values obtained by adding received signal strengths of slots of the resource allocation channel, which are mapped to the temporally overlapping communication resources, to interference weights according to frequency differences between the temporally overlapping communication resources and the each of the unoccupied communication resources, and the received signal strengths of the slots of the resource allocation channel and the interference weights may be expressed in dam unit and dB unit, respectively.

The selecting of the first communication resource based on the calculated interference power for each of the unoccupied communication resources may comprise determining, by the first distributed terminal, allocable candidate communication resources based on the calculated interference power for each of the unoccupied communication resources; receiving, from the second distributed terminal, information on candidate communication resources allocable by the second distributed terminal; determining valid candidate communication resources allocable to both the first distributed terminal and the second distributed terminal; and selecting the first communication resource from among the valid candidate communication resources.

In the allocating of the selected first communication resource, the first distributed terminal and the second distributed terminal may simultaneously perform allocation contention in a first slot of the resource allocation channel, which is mapped to the selected first communication resource.

The allocation contention which each of the first distributed terminal and the second distributed terminal performs in the first slot may comprise selecting, by each of the first distributed terminal and the second distributed terminal, a same first subslot from the first slot composed of a plurality of subslots; performing, by each of the first distributed terminal and the second distributed terminal, first carrier sensing from a first-in-time subslot to the first subslot of the first slot; abandoning, by each of the first distributed terminal and the second distributed terminal, the contention when a signal of another terminal is sensed as a result of the first carrier sensing, and starting, by each of the first distributed terminal and the second distributed terminal, signal transmission in the first subslot and selecting a same second subslot when a signal of another terminal is not sensed as the result of the first carrier sensing; stopping, by each of the first distributed terminal and the second distributed terminal, the signal transmission in the second subslot, and performing, by each of the first distributed terminal and the second distributed terminal, second carrier sensing; and abandoning, by each of the first distributed terminal and the second distributed terminal, the contention when a signal of another terminal is sensed as a result of the second carrier sensing, and assuming, by each of the first distributed terminal and the second distributed terminal, that each of the first distributed terminal and the second distributed terminal has won the contention and resuming signal transmission from a next subslot of the second subslot to a last subslot.

The continuously occupying of the allocated first communication resource may comprise simultaneously transmitting, by the first distributed terminal and the second distributed terminal, a signal of a predetermined level in a first-in-time subslot of a first slot of the resource allocation channel, which is mapped to the allocated first communication resource.

The operation method may further comprise, after the continuously occupying of the allocated first communication resource, checking a collision of the allocated first communication resource.

The checking of the collision of the allocated first communication resource may comprise transmitting, by the first distributed terminal, a collision tone in sonic subslots of predetermined transmittable subslots except a first-in-time subslot among subslots of a slot of the resource allocation channel, which is mapped to the allocated first communication resource; transmitting, by the second distributed terminal, a collision tone in some subslots of predetermined transmittable subslots different from a region in which the first distributed terminal transmits a collision tone, except the first-in-time subslot among the subslots of the slot of the resource allocation channel, which is mapped to the allocated first communication resource; and detecting, by the first distributed terminal and the second distributed terminal, a collision tone in subslots where neither of the first distributed terminal and the second distributed terminal transmits a collision tone, in the slot of the resource allocation channel, which is mapped to the allocated first communication resource.

The operation method may further comprise, when a resource collision is determined in the checking of the collision of the allocated first communication resource, determining whether to allow the resource collision; and in response to determining not to allow the resource collision, returning the first communication resource.

The predetermined level may be determined as a vale obtained by adding a. predetermined power to a transmission power of the first communication resource.

Using the exemplary embodiments according to the present disclosure, in a synchronized distributed wireless communication system, a number of distributed terminals (e.g., drones) can autonomously select control or mission channel resources in real time without resource collision. Further, using the exemplary embodiments according to the present disclosure, when a collision in a communication resource is detected in real time, and the resource collision occurs, another communication resource without resource collision can be selected again to perform communication. Since such the stable allocation of communication resources guarantees operational stability of the drones, it enables practical commercialization of small drones.

BRIEF DESCRIPTION OF DRAWINGS

Exemplary embodiments of the present disclosure will become more apparent by describing in detail embodiments of the present disclosure with reference to the accompanying drawings, in which:

FIGS. 1C and 1D are conceptual diagrams for describing a concept of grouping multi-channel resources according to an exemplary embodiment of the present disclosure;

FIGS. 2A and 2B are conceptual diagrams for describing a near-far problem occurring in a wireless distributed communication system;

FIG. 8 is a conceptual diagram for describing communication environments of subchannels based on measurement through a resource allocation channel according to an exemplary embodiment of the present disclosure;

FIGS. 9A, 9B, and 9C are conceptual diagrams for describing contention in a slot for a resource allocation channel according to an exemplary embodiment of the present disclosure;

FIGS. 10A, 10B, and 10C are conceptual diagrams for describing a communication environment monitoring concept using a collision tone according to Reference 2;

FIG. 11 is a conceptual diagram for describing configuration of a transmission power range for each subchannel to solve a near-far problem according to an exemplary embodiment of the present disclosure;

Figure 1A:
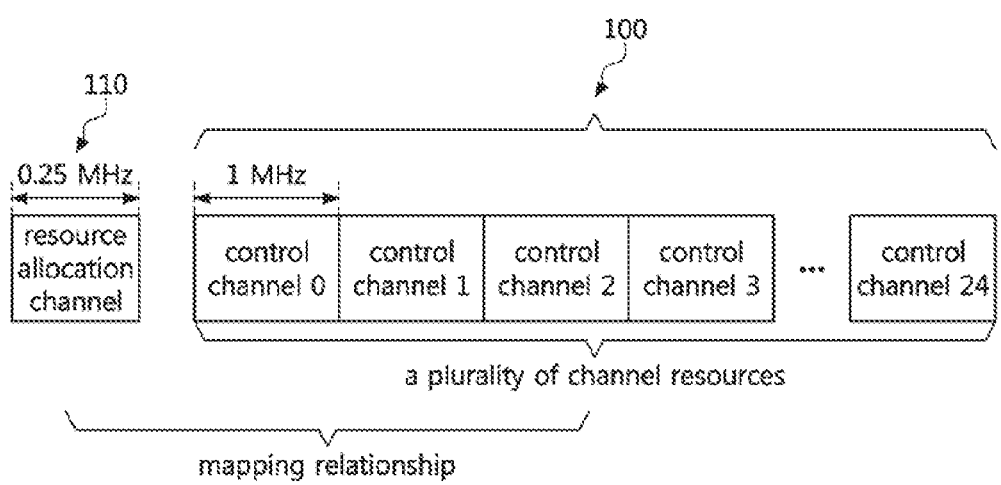
FIG. 1A is a conceptual diagram for describing a configuration example of channels according to an exemplary embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present, in contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present disclosure will be described in greater detail with reference to the accompanying drawings. To facilitate overall understanding of the present disclosure, like numbers refer to like elements throughout the description of the drawings, and description of the same component will not be reiterated.

Reference 1: Korean Published Patent Application KR10-2018-0058662, 'Method for collision avoidance in synchronized wireless communication system' (Patent number KR2034529, issue date 2019 Oct. 15)

Reference 2: Korean Published Patent Application KR10-2018-0058668, 'Method for efficiently using tone channels in wireless synchronized communication system'

The present disclosure proposes a method in which a number of distributed drones autonomously allocate multi-channel resources for control or mission in real time without resource collision in a synchronized wireless distributed communication system. An object of the present disclosure is to autonomously allocate multi-channel resources for control or mission by a number of distributed drones in a synchronized wireless distributed communication system in real time without resource collision. In the following, allocation of control communication resources among a plurality of control channels having different center frequencies will be described, but mission communication resources may be allocated in the same manner. In the following, each of channels having different center frequencies used for control will be referred to as a 'control channel'.

The characteristic of a synchronized distributed wireless communication system is that there is not a central control station and all terminals are synchronized.

FIG. 1A is a conceptual diagram for describing a configuration example of channels according to an exemplary embodiment of the present disclosure. Referring to FIG. 1A, a total of 25 control channels 100 having different center frequencies may exist, and each control channel may have a bandwidth of 1 MHz. Meanwhile, a resource allocation channel 110 may have a bandwidth of 0.25 MHz. The configuration of the resource allocation channel will be described later. The numbers and bandwidths of the control channels 100 and the resource allocation channel 110 may be set differently according to an operation bandwidth of the synchronized distributed wireless communication system and the number of distributed terminals existing in the synchronized distributed wireless communication system. That is, the synchronized distributed wireless communication system according to the present disclosure is not limited to the configuration example of FIG. 1A and those of FIGS. 1B to 1D to be described later.

Figure 1B:
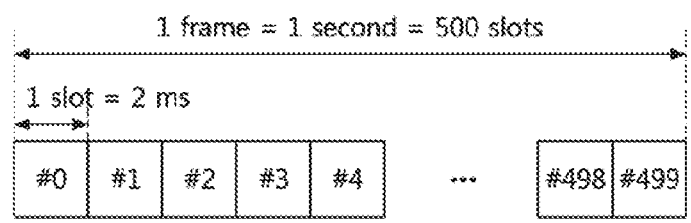
FIG. 1B is a conceptual diagram for describing a configuration example of each control channel constituting multi-channel resources according to an exemplary embodiment of the present disclosure.

FIG. 1B is a conceptual diagram for describing a configuration example of each control channel constituting multi-channel resources according to an exemplary embodiment of the present disclosure. Referring to FIG. 1B, each control channel may have 500 slots (e.g., #0 to #499) for each frame. For example, assuming a 1 second frame, each slot may have a length of 1/500 second (i.e., 2 milliseconds).

Figure 1D:
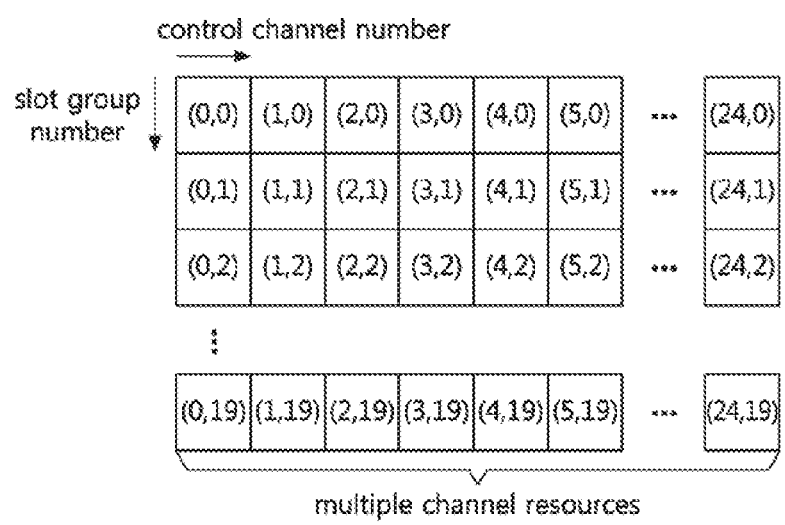

FIGS. 1C and 1D are conceptual diagrams for describing a concept of grouping multi-channel resources according to an exemplary embodiment of the present disclosure. Referring to FIG. 1C, for each control channel, 500 slots may be grouped into 20 slot groups (e.g., slot groups 0 to 19), and each slot group may include 25 slots. Assuming that each slot group is allocated to one distributed terminal, 25 control channels may be grouped into 500 groups (i.e., 500=20 slot groups×25 control channels), and may support 500 distributed terminals. Accordingly, one slot group may become one communication resource. Hereinafter, a communication resource corresponding to one slot group may be simply referred to as a 'subchannel', and thus, in the present exemplary embodiment, one subchannel may mean one communication resource. That is, each subchannel may be composed of a group of a plurality of slots temporally separated in the same frequency band. Referring to FIG. 1D, each of the above-described subchannels may be indicated by (f, s). In an exemplary embodiment, f may indicate a control channel number having a value from 0 to 24, and s may indicate a slot group number having a value from 0 to 19 in the control channel indicated by f.

As in the above-described exemplary embodiment, a reason for using a plurality of channel resources having different center frequencies and having a small bandwidth without using one channel having a large bandwidth in drone communication targeted by the present disclosure is as follows. First, if the bandwidth is large, a communication distance may be reduced by that amount, so the communication distance may be increased by using a channel resource of a small bandwidth. Second, since the number of bits of control data transmitted through the control channel is small, control data can be sufficiently transmitted with only a small bandwidth resource.

In addition, in the above-described exemplary embodiment, a reason why one control channel is divided into 500 slots and one subchannel is configured to include 25 slots is as follows. First, when the distributed terminal is a drone, it is generally required to be controlled 20 times per second. Therefore, a control terminal (e.g., a distributed communication terminal capable of controlling other distributed communication terminals) may have opportunities to transmit signals to the distributed terminal (e.g., drone) 20 times per second, and the distributed terminal (e.g., drone) may have opportunities to transmit signals to the control terminal 5 times per second. In FIG. 1C, hatched slots (e.g., slots #80, #180, . . . , #480) may refer to slots used by a distributed terminal (e.g., drone) to transmit signals to a control terminal, and unhatched slots (e.g., slots #0, #20, . . . , #460) may refer to slots used by the control terminal to transmit signals to the distributed terminal (e.g., drone). Accordingly, as shown in FIG. 1C, one control channel having an independent center frequency may have 20 subchannels and can support 20 drones.

Meanwhile, an important issue to be considered in the wireless distributed communication system is a near-far problem.

Figure 2B:
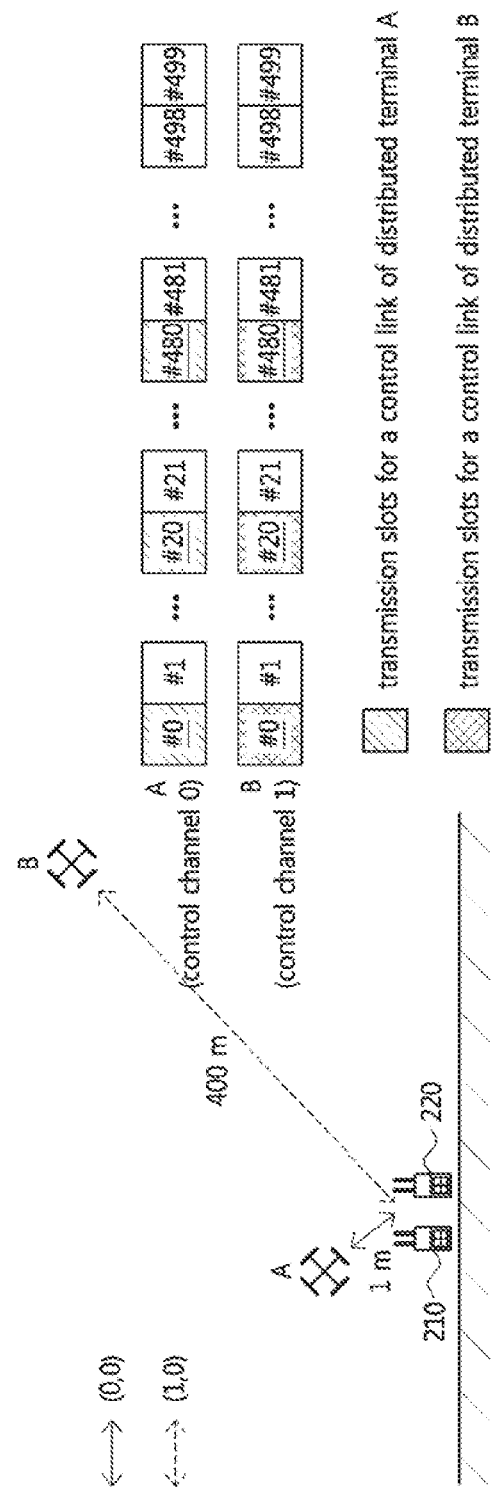

FIGS. 2A and 2B are conceptual diagrams for describing a near-far problem occurring in a wireless distributed communication system.

As shown in FIG. 2A, if a distributed terminal A and a distributed terminal B respectively use a subchannel (0, 0) and a subchannel (0, 1) which are resources not overlapping in time, since the distributed terminal A and the distributed terminal B transmit signals at different times, interferences due to a near-far problem may not occur. However, as shown in FIG. 2B, if the distributed terminal A and the distributed terminal B respectively use the subchannel (0, 0) and a subchannel (1, 0) which are resource overlapping in time, since the distributed terminal A and the distributed terminal B transmit signals at the same time, interferences due to a near-far problem may occur.

In FIG. 2B, a control terminal 210 for the distributed terminal A and a control terminal 220 for the distributed terminal B are at approximately the same position. However, the distributed terminal B is located at a distance (about 400 m) from the control terminals, and the distributed terminal A is located at a close distance (about 1 m) from the control terminals. Therefore, the signal from the distributed terminal B using the subchannel (1, 0) may be received at the two control terminals with a very little power, and the signal from the distributed terminal A using the subchannel (0, 0) may be received at the two control terminals with a very large power. That is, the signal of the distributed terminal A mainly exists on the control channel 0, but the signal of the distributed terminal A leaking to the control channel 1 may also exist. Hereinafter, it is assumed that the leakage signal (i.e., the signal of the distributed terminal A on the control channel 1) is 50 dB less than the signal on the target channel (i.e., the signal of the distributed terminal A on the control channel 0). If the distributed terminal A is located at a distance of 1 m from the two control terminals 210 and 220, and the distributed terminal B is located at a distance of approximately 400 m from the two control terminals 210 and 220, the signal of the distributed terminal B may be received at the control terminals with about 52 dB lower power than the signal of the distributed terminal A. For example, if the signal of the distributed terminal A is received at the control terminals 210 and 220 with a power of −30 dBm, the signal of the distributed terminal B may be received at the control terminals 210 and 220 with a power of −82 dBm.

Figure 3:
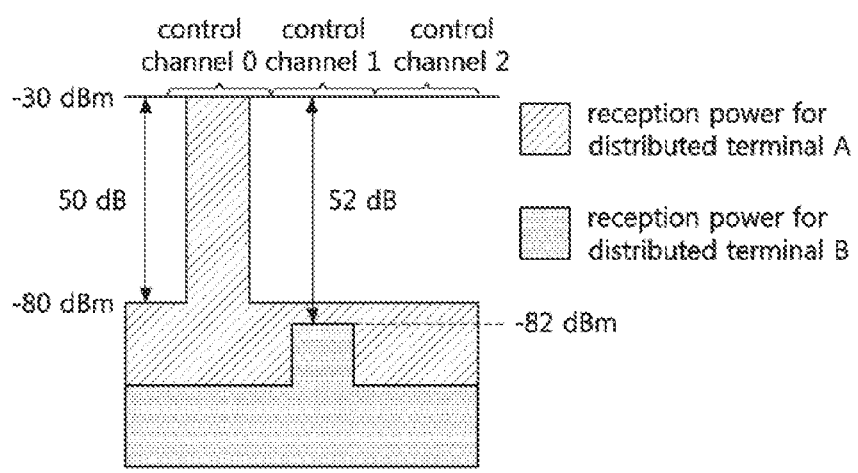
FIG. 3 is a conceptual diagram for describing received signal powers due to a near-far problem occurring in a wireless distributed communication system.

FIG. 3 is a conceptual diagram for describing received signal powers due to a near-far problem occurring in a wireless distributed communication system.

As shown in FIG. 3, since the reception power for the distributed terminal B, which is received through the control channel 1, is −82 dBm at the two control terminals 210 and 220, it may be less than the signal leaking from the distributed terminal A to the control channel 1, which is −80 dBm. In this case, the control terminal 220 may not receive the signal of the distributed terminal B.

When the distributed terminals are drones, signal interferences due to the above-described near-far problem may not be allowed because they may cause a very critical safety problem. Therefore, the distributed terminals should be able to predict and avoid out-of-control situations due to the signal interferences in advance. In order to predict and avoid such the signal interferences in advance, each distributed terminal may need to measure communication environments of communication resources (e.g., subchannels) existing in all frequency channels in real time. This is because communication environments of communication resources existing in each channel are all different for each distributed terminal.

As described above, since the distributed terminals (e.g., drones) need to measure the communication environments of communication resources (e.g., subchannels) that change in real time, a small drone flight permit approval agency cannot monitor subchannels that each drone can use in real time and allocate subchannels to be used by each distributed terminal in real time. However, each distributed terminal also has a problem that it is not easy to measure the communication environments of subchannels in real time. In order for the distributed terminal to measure the states of subchannels within channels having different center frequencies, it should simultaneously receive the channels having different center frequencies. To do this, a number of hardware (especially, RF hardware) corresponding to the number of the channels having different frequencies may be required. In reality, the number of RF hardware that a drone can mount may be very limited. The communication environment to be identified by the distributed terminal may include whether each communication resource (e.g., subchannel) is occupied, an amount of interferences to each communication resource, and/or a reception power of each communication resource.

In addition, even if each distributed terminal knows the communication environments of the subchannels, there may be no way to properly allocate them. The distributed terminal has no choice but to operate by simply using a subchannel in an unoccupied state first. In this case, if two or more distributed terminals use a subchannel in an unoccupied state at the same time, a communication resource collision may occur, and the distributed terminals (e.g., drones) may fall into an uncontrollable state due to the communication resource collision.

In addition, the synchronized wireless distributed communication system may operate in a manner in which the same resource is reused unless there is interference. That is, if there is little communication interference, the same communication resource can be reused.

Figure 4:
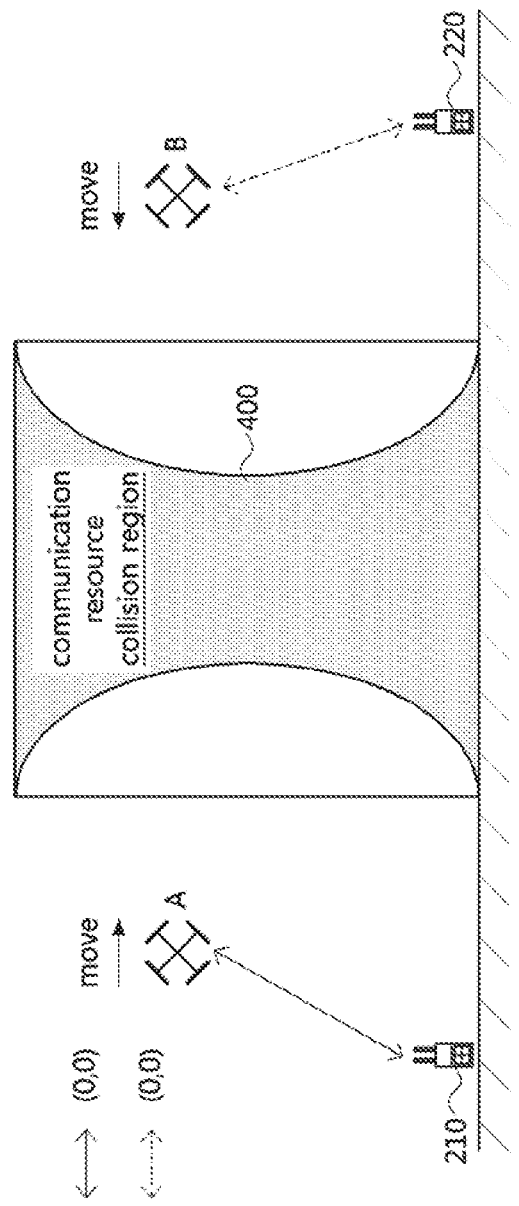
FIG. 4 is a conceptual diagram for describing an uncontrollable state that may occur due to a resource reuse in a synchronized wireless distributed communication system.

FIG. 4 is a conceptual diagram for describing an uncontrollable state that may occur due to a resource reuse in a synchronized wireless distributed communication system.

As shown in FIG. 4, when two distributed terminals using the same subchannel (0, 0) approach close to each other and enter a communication resource collision region 400, control of the distributed terminals may suddenly become impossible. In a situation where the two distributed terminals are far apart, there is no interference between communication links of the distributed terminal A and the distributed terminal B using the same subchannel (0, 0). However, since communication interference increases when the two distributed terminals are close, the control of the distributed terminals may become impossible.

Accordingly, the present disclosure proposes a method of allocating a plurality of communication resources and using the resource allocation channel for measuring communication environments of the plurality of communication resources. Referring back to FIG. 1A, the resource allocation channel 110 has a center frequency independent from those of the control channels 100.

Figure 5:
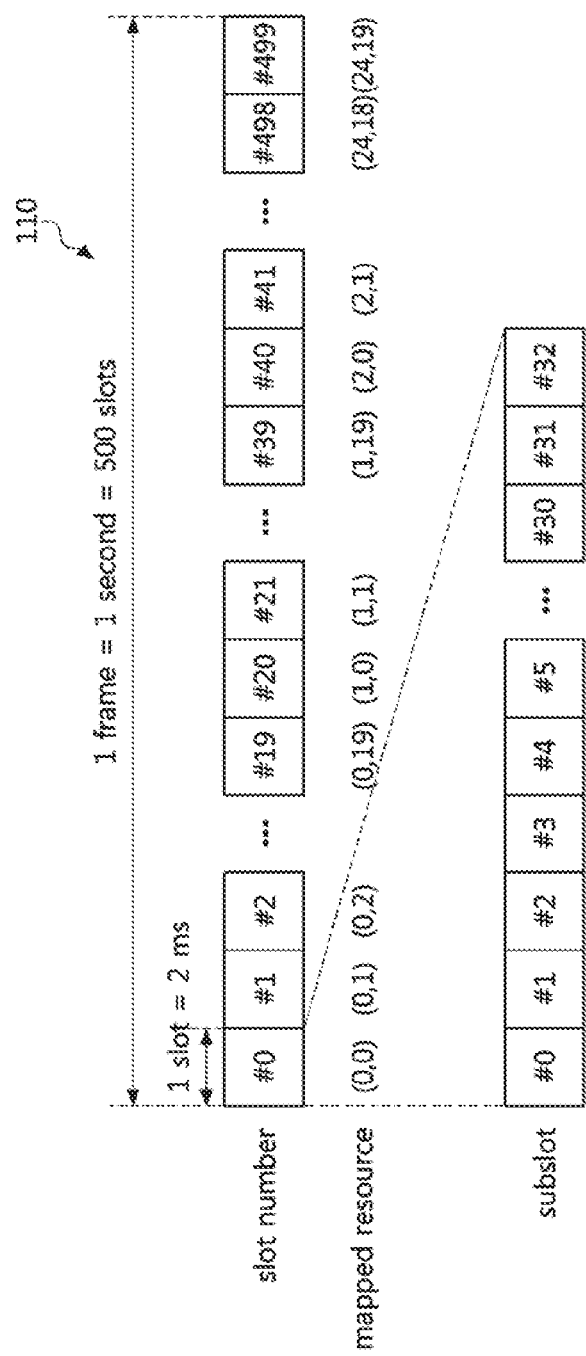
FIG. 5 is a conceptual diagram for describing a configuration example of a resource allocation channel according to an exemplary embodiment of the present disclosure.

FIG. 5 is a conceptual diagram for describing a configuration example of a resource allocation channel according to an exemplary embodiment of the present disclosure.

As shown in FIG. 5, the resource allocation channel 110 may have 500 slots per second, like each control channel. Each slot of the resource allocation channel may be mapped to each of the communication resources (e.g., subchannels). In addition, it is assumed that a first communication resource mapped to a first slot is allocated to the distributed terminal to which the first slot of the resource allocation channel is allocated. Hereinafter, a slot of the resource allocation channel, which is mapped to one subchannel will be referred to as a 'mapping slot'.

For example, as shown in Table 1 and FIG. 5, it is assumed that a subchannel (0, 0) is allocated to a distributed terminal to which a mapping slot #0 is allocated, and a subchannel (0, 1) is allocated to a distributed terminal to which a mapping slot #1 is allocated. In the same manner, it is assumed that a subchannel (0, 19) is allocated to a distributed terminal to which a mapping slot #19 is allocated, and a subchannel (1, 0) is allocated to a distributed terminal to which a mapping slot #20 is allocated.

When the mapping is performed in the above-described manner, one resource allocation channel may be mapped to a maximum of 25 control channels having different center frequencies. If there are more than 25 control channels, a resource allocation channel having a larger bandwidth may be used, or two or more resource allocation channels may be used. Table 1 below is for describing an example of a mapping relationship between slots of the resource allocation channel and the subchannels, in Table 1 below, transmission power ranges configured for each of the mapping slots or a group of the mapping slots are intended to solve the near-far problem, and a solution to the near-far problem through these will be described later.

TABLE 1

| Mapping slot number | Mapped subchannel | Transmission power range (dBm) |
|---|---|---|
| 0 | (0, 0) | −10~−5 |
| 1 | (0, 1) | −10~−5 |
| 2 | (0, 2) | −10~−5 |
| 3 | (0, 3) | −10~−5 |
| 4 | (0, 4) | 0~5 |
| ... | ... | ... |
| 19 | (0, 19) | 30~35 |
| 20 | (1, 0) | −10~−5 |
| 21 | (1, 1) | −10~−5 |
| ... | ... | ... |
| 498 | (24, 18) | 30~35 |
| 499 | (24, 19) | 30~35 |

As described above, when the slots of the resource allocation channel and subchannels (communication resources) are mapped, the following advantages can be obtained. First, the distributed terminal can measure the communication environments of all subchannels simply by monitoring one resource allocation channel. Second, each distributed terminal can autonomously select a subchannel (communication resource). Third, the distributed terminal can measure a collision or interference situation of the communication resource allocated by the distributed terminal itself in real time, and move a control link to another communication resource with less resource collision or interference according to the measurement result.

Figure 6:
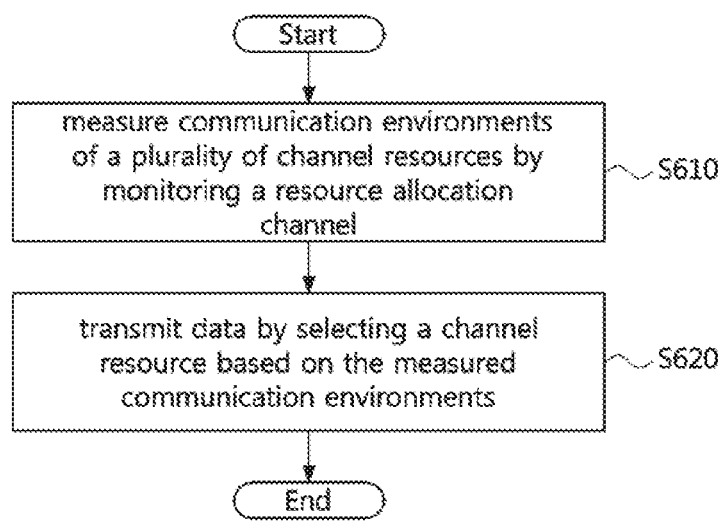
FIG. 6 is a flowchart for describing a method of operating a synchronized wireless distributed communication system according to an exemplary embodiment of the present disclosure.

FIG. 6 is a flowchart for describing a method of operating a synchronized wireless distributed communication system according to an exemplary embodiment of the present disclosure.

In a synchronized wireless distributed communication system according to an exemplary embodiment of the present disclosure, configuration information for a plurality of communication resources, configuration information of a resource allocation channel having a center frequency independent from the plurality of communication resources, and a mapping relationship between slots of the resource allocation channel and the plurality of communication resources may be preconfigured to control terminals and distributed terminals constituting the system.

Each of the distributed terminals may receive (sense) the resource allocation channel (i.e., the slots of the resource allocation channel), and measure communication environments of the plurality of communication resources using the configured mapping relationship (S610). Also, each of the distributed terminals may select a communication resource to use based on the measured communication environments of the plurality of communication resources, and transmit data (control data) through the selected communication resource (S620).

Specifically, an operation of the distributed terminal (i.e., the steps S610 and S620) may be performed as follows.

Figure 7:
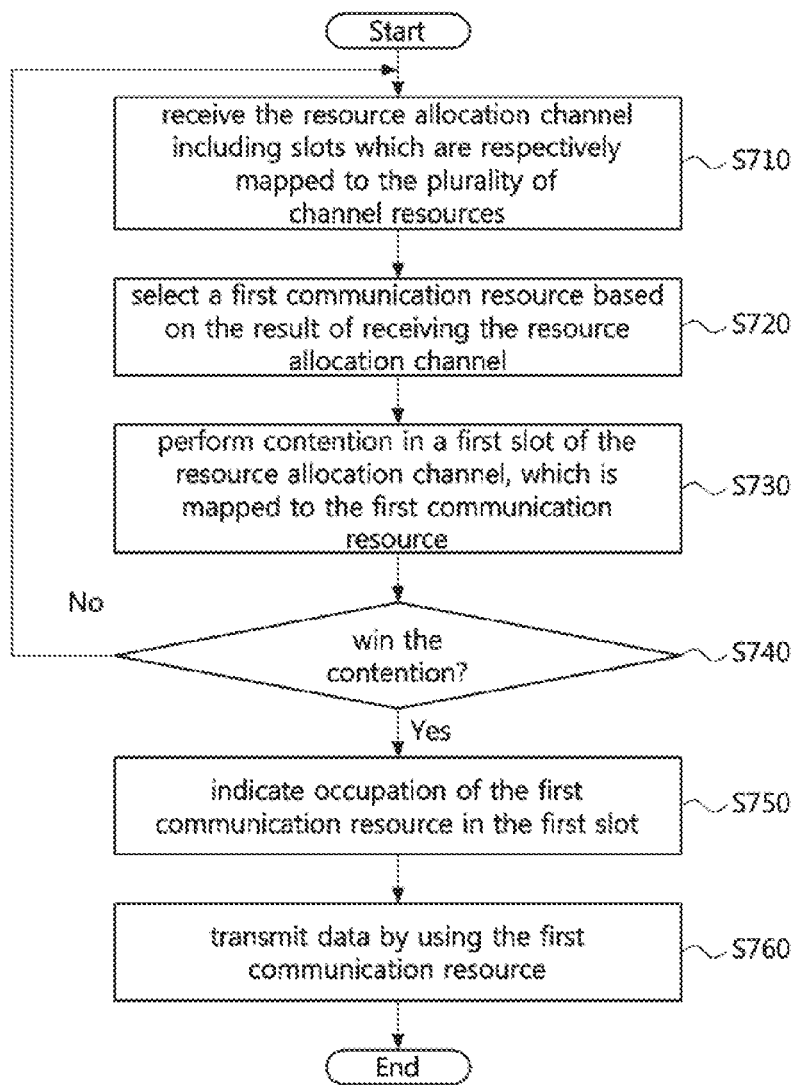
FIG. 7 is a flowchart for describing an operation method of each distributed terminal belonging to a synchronized wireless distributed communication system according to an exemplary embodiment of the present disclosure.

FIG. 7 is a flowchart for describing an operation method of each distributed terminal belonging to a synchronized wireless distributed communication system according to an exemplary embodiment of the present disclosure.

The distributed terminal may receive a resource allocation channel including slots each of which is mapped to each of a plurality of communication resources (S710), and may select a first communication resource (e.g., subchannel) to use for transmission of data (control data) based on a result of the reception of the resource allocation channel (S720).

In the step S720, the following two communication environments may be considered. The first is whether each of the plurality of communication resources is occupied, and the second is the amount of interferences at each of the plurality of communication resources.

First, the distributed terminal may measure a reception power of each slot of the resource allocation channel, and if the measured reception power is less than a predetermined threshold, it may determine that a subchannel (i.e., communication resource) mapped to the corresponding slot is not occupied. For example, when the predetermined threshold is −105 dBm, reception powers of slots #0, #1, #2, and #3 of the resource allocation channel are −80 dBm, −107 dBm, −110 dBm, and −103 dBm, respectively, the distributed terminal may determine that the subchannel (0, 0) and the subchannel (0, 3) are occupied, and the subchannel (0, 1) and the subchannel (0, 2) are not occupied.

Meanwhile, interference may exist only between subchannels through which signals are transmitted at the same time. That is, there is no mutual interference between subchannels separated in time. In order to calculate the amount of interference between subchannels through which signals are transmitted at the same time, subchannels existing at frequencies different from that of a target subchannel should be considered. For example, assuming communication resources consisting of 25 control channels and 20 subchannels for each control channel described in FIGS. 1A to 1D, the amount of interferences for the subchannel (0, 0) may be a value obtained by summing interferences caused by all subchannels (e.g., subchannel (1, 0), subchannel (2, 0), subchannel (3, 0, . . . , subchannel (23, 0), and subchannel (24, 0)) temporally overlapping with the subchannel (0, 0). This may be expressed as Equation 1 below.

$$I_{f,s} = \cdot \sum_{i=0, i \neq f}^{24} I_{f,s,i} \quad \text{[Equation 1]}$$

Here, $I_{f,s}$ is the total amount of interferences received at the subchannel (f, s), and $I_{f,s,i}$ is the amount of interferences from the subchannel (i, s) to the subchannel (f, s). $I_{f,s,i}$ may be defined as in Equation 2 below. An interference weight smaller than 0 may be determined according to a center frequency difference |f−i| between the subchannel (f, s) and the subchannel (i, s) may be determined, and a value obtained by adding the predetermined interference weigh to a reception power measured in the slot of the resource allocation channel mapped to the subchannel (i, s) may be calculated as the interference amount. Here, the unit of $I_{f,s,i}$ may be dBm. The interference weight may be expressed as a negative value.

$$I_{f,s,i} = (P_{i,s} + T(|f-i| + D_i)) \text{dBn} \quad \text{[Equation 2]}$$

Here, $P_{i,s}$ is the reception power of the subchannel (i, s) and the unit thereof is dBm. $D_f$ is a value for correcting the reception power difference caused by the center frequency difference between the resource allocation channel and the subchannel (f, s). If the center frequency of the resource allocation channel is lower than the center frequency of the subchannel, $D_f$ may have a negative value. If the center frequency of the resource allocation channel is higher than the center frequency of the subchannel, $D_f$ may have a positive value. For example, if the center frequency of the resource allocation channel is approximately 2 GHz and the center frequency of the subchannel is approximately 4 GHz, $D_f$ may be approximately −6 dB. T(•) may be set as shown in Table 2 and the unit thereof is dB. Table 2 is an example for convenience of description only.

TABLE 2

| |f − i| | T(·) |
| --- | --- |
| 0 | |
| 1 | −60 |
| 2 | −65 |
| 3 | −70 |
| 4 | −75 |
| 5 | −80 |
| 6 | −85 |
| 7 | −90 |
| 8 | −95 |
| 9 | −100 |
| 10 | −105 |
| 11 | −110 |
| 12 | −115 |
| 13 | −120 |
| 14 | −125 |
| 15 | −130 |
| 16 | −135 |
| 17 | −140 |
| 18 | −140 |
| 19 | −140 |
| 20 | −140 |
| 21 | −140 |
| 22 | −140 |
| 23 | −140 |
| 24 | −140 |

FIG. 8 is a conceptual diagram for describing communication environments of subchannels based on measurement through a resource allocation channel according to an exemplary embodiment of the present disclosure.

As shown in FIG. 8, when weights for center frequency differences are defined as shown in Table 2, the interference of the subchannel (5, 0) on the subchannel (6, 0) and the subchannel (7, 0) may be respectively −110 dBm and −120 dBm, which are obtained by adding the interference weights −50 dB and −60 dB according to the center frequency differences 1 and 2 to the reception power −60 dBm of the slot #125 of the resource allocation channel mapped to the subchannel (5,0).

The total amount of interferences in the subchannel (6, 0) is a sum of the amount of interferences from a total of 24 subchannels temporally overlapped with the subchannel (6, 0) excluding the subchannel (6, 0). Here, since each interference amount is expressed in dBm, the correct result value can be calculated only after the value expressed in dBm is converted into a general scalar value. For example, assuming that the interference amount of each of the 24 subchannels is −110 dBm (i.e., $10^{-11}$ mW), the total interference amount is $24 \times 10^{-11}$ mW. Converting this to a dBm value results in −96.2 dBm.

If the predetermined interference threshold is −105 dBm, since the total amount of interferences present in the subchannel (6, 0) is −96.2 dBm, even when the subchannel (6, 0) is not occupied, the distributed terminal cannot use the subchannel (6, 0).

Thereafter, the distributed terminal may select one subchannel (hereinafter, referred to as a 'first subchannel') from among the subchannels determined to be usable, and may perform contention on a slot (hereinafter, referred to as a 'first slot') of the resource allocation channel mapped to the selected first subchannel (S730). In this case, the contention scheme described in Reference 1 may be applied almost as it is. However, according to Reference 1, a link is established only after a distributed terminal allocates a resource by performing contention alone, and a request for consent for resource allocation is transmitted to another party using the allocated resource. However, according to the exemplary embodiments of the present disclosure, since a drone (i.e., distributed terminal) and a controller (i.e., control terminal) simultaneously compete with each other to allocate a resource, there is no need to request another party to consent to the resource allocation. In this case, the contention may be conducted as follows.

First, each slot of the resource allocation channel, in which contention is performed, may be divided into a plurality of subslots, and the contention may be performed by being divided into a first contention and a second contention. Hereinafter, it is assumed that one slot of the resource allocation channel is divided into 33 subslots, and the first contention and the second contention are performed within one slot.

Figure 9C:
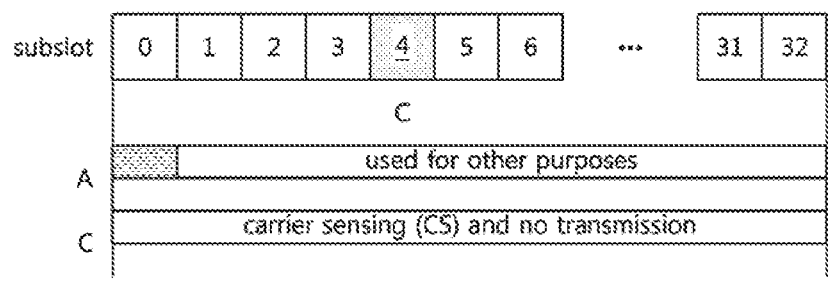

FIGS. 9A to 9C are conceptual diagrams for describing contention in a slot for a resource allocation channel according to an exemplary embodiment of the present disclosure.

In the first contention, the distributed terminal may randomly select one of the remaining subslots excluding a subslot 0 among subslots (i.e., subslots 0 to 32) constituting one resource allocation channel slot (i.e., the first slot), perform carrier sensing on subslots from the subslot 0 to a previous subslot of the selected subslot, and transmit a signal of a predetermined level from the selected subslot to the last subslot of the first slot. Hereinafter, the subslot selected by the distributed terminal in the first contention is referred to as a 'first subslot', and a subslot selected by the distributed terminal in the second contention is referred to as a 'second subslot'. In the first contention, a distributed terminal selecting an earliest subslot may win. The control terminal may perform the same first contention at the same time, and the first subslot selected by the related distributed terminal and the control terminal is the same. This simultaneous contention performed by the distributed terminal and the control terminal may prevent resource collision with other distributed terminals around the two distributed terminals.

Referring to FIG. 9A, when distributed terminals A, B, and C select subslots 2, 5, and 31, respectively, and the distributed terminal A selecting an earliest subslot 2 may win. The distributed terminal B selecting the subslot 5 may perform carrier sensing up to the subslot 4, and thus the distributed terminal B may sense a signal of the distributed terminal A transmitted from the subslot 2, so that the distributed terminal B may determine that the corresponding subchannel is occupied, and abandon the contention. The distributed terminal C selecting the subslot 31 may perform carrier sensing up to the subslot 30, and thus the distributed terminal C may sense the signal of the distributed terminal A transmitted from the subslot 2, so that the distributed terminal C may determine that the corresponding subchannel is occupied, and abandon the contention. Here, the control terminal related to the distributed terminal A may also select the subslot 2 selected by the distributed terminal A as its own first subslot, and perform the first contention at the same time.

The second contention may be performed only by the distributed terminals that have won the first contention. For example, as shown in FIG. 9B, assuming that distributed terminals A, B, and C all select the subslot 2 in the first contention, the distributed terminals A, B, and C all win the first contention. This is because all three distributed terminals determine that the subchannel is not occupied after sensing the subslots 0 and 1. All distributed terminals that have won the first contention in this manner may perform the second contention.

In the second contention, each distributed terminal may randomly select one of subslots from a next subslot of the first subslot to the last subslot as the second subslot, may transmit a signal of a predetermined level from the first subslot to a previous subslot of the second subslot, and may perform carrier sensing in the second subslot. In addition, when it is determined that the second subslot is not occupied as a result of the carrier sensing on the second subslot, each distributed terminal may transmit a signal of a predetermined level from a next subslot of the second subslot to the last subslot, and when it is determined that the second subslot is occupied as a result of the carrier sensing on the second subslot, each distributed terminal may stop the signal transmission. In the second contention, a distributed terminal selecting a latest subslot as the second subslot may win. For example, as shown in FIG. 9B, when the distributed terminals A, B, and C select subslots 31, 6, and 4, respectively, the distributed terminal A selecting the latest subslot 31 will win the second contention. The distributed terminal C may stop the signal transmission in the subslot 4, perform carrier sensing, sense the signal of the distributed terminal A and distributed terminal B, thereby abandoning the contention because it determines that the corresponding subchannel is occupied. The distributed terminal B may stop the signal transmission in the subslot 6, perform carrier sensing, and sense the signal of the distributed terminal A, thereby abandoning the contention because it determines that the corresponding subchannel is occupied. Here, the control terminal related to the distributed terminal A may also select the subslot 31 selected by the distributed terminal A as its own second subslot, and perform the second contention at the same time. However, the control terminal may not have won the first contention, and in this case, the control terminal cannot perform the second contention. Therefore, the second contention may be performed only by the distributed terminal A or only the control terminal, depending on a case.

Thereafter, the distributed terminal may determine whether or not the contention has been won (S740), and when it did not win the contention, the distributed terminal may perform again the step S710 of monitoring the resource allocation channel. On the other hand, when it won the contention, the distributed terminal may perform a step S750 of indicating that the corresponding subchannel is occupied in the corresponding slot and a step S760 of transmitting data (i.e., control data) using the selected subchannel.

In the step S750, the distributed terminal may perform 'slot clearing' in order to continuously occupy the corresponding subchannel. That is, if the distributed terminal wins contention in a specific slot (i.e., the first slot) of the resource allocation channel, the distributed terminal may always win contention in the corresponding slot by transmitting a signal of a predetermined level (i.e., clearing tone) in a subslot 0 of the same slot (i.e., the first slot) from a next frame. This is because distributed terminals performing contention the first slot cannot select the subslot 0 and should always perform carrier sensing on the subslot 0. As shown in FIG. 9C, since distributed terminals except the distributed terminal A (e.g., distributed terminals B and C) always need to perform carrier sensing on the subslot 0, they detect the signal of the distributed terminal A performing slot clearing, and always lose the contention. Accordingly, the distributed terminal A may continuously occupy the first slot (i.e., the first control channel). Here, the control terminal related to the distributed terminal A may also perform slot clearing by transmitting a tone signal in the subslot 0 of the same mapping slot.

Unlike Reference 1, since the above-described resource allocation contention is performed by the related distributed terminal and the control terminal at the same time, the distributed terminal and the control terminal should check whether a link has been established by transmitting and receiving packets after the resource allocation competition. This is because, in the synchronized wireless distributed communication, even when the distributed terminal and the control terminal perform contention using the same first and second subslots, only one of the two terminals may successfully win the contention for resource allocation.

That is, in Reference 1, a distributed terminal that succeeds in resource allocation contention transmits a link establishment request packet to another distributed terminal. However, the distributed terminal and the steering terminal according to the present disclosure respectively perform a task of checking whether a link has been established. The most basic scheme of checking whether a link has been established is to check whether a counterpart signal is received from the subchannel in which resource allocation has been successful. If a signal of another terminal is not received for a certain period of time, it may be regarded as a failure of establishing a link. In this case, the terminal that has successfully allocated the resource also may returns the communication resource allocated by it. The allocated resource may be returned by stopping the slot clearing in the slot of the resource allocation channel, which is mapped to the allocated resource.

In the same manner as described above, the distributed terminal can stably allocate and use subchannels. However, since the communication environment of the distributed terminal continuously changes according to the movement of the distributed terminal (e.g., drone), the distributed terminal should continuously monitor the communication environment it experiences. This is possible by continuously receiving the resource allocation channel.

For this monitoring, even when a distributed terminal occupies a specific slot, the remaining subslots other than the subslot 0 used for slot clearing may be used for various purposes. In Reference 2, the distributed terminal transmits a collision tone in the remaining subslots except the subslot 0 of the slot that it occupies, and continuously monitors a collision in the allocated slot. That is, the distributed terminal may transmit a clearing tone in the subslot 0 of the slot occupied by it, and may transmit a collision tone even in some subslots randomly selected among the remaining subslots. Hereinafter, it is assumed that the distributed terminal transmits a collision tone in three randomly selected subslots.

Figure 10A:
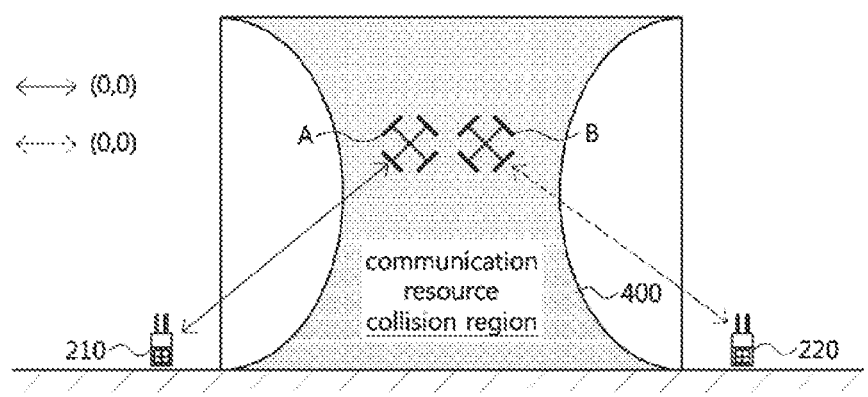

FIGS. 10A, 10B, and 10C are conceptual diagrams for describing a communication environment monitoring concept using a collision tone according to Reference 2.

As shown in FIG. 10A, when there is the distributed terminal B, which has been allocated the same slot 0 as the distributed terminal A, around the distributed terminal A, the distributed terminal A may transmit a collision tone in some subslots of the allocated slot 0 except the allocated subslot 0, and perform carrier sensing on subslots in which the collision tone is not transmitted. That is, the distributed terminal A may detect a collision tone of another distributed terminal in the subslots in which it does not transmit the collision tone. The distributed terminal may determine that a collision has occurred in the corresponding slot when a collision tone having an intensity greater than or equal to a threshold is detected by the carrier sensing. For example, as shown in FIG. 10B, since the distributed terminal A transmits the collision tone in the subslots 2, 5, and 20 and the distributed terminal B transmits the collision tone in the subslots 8, 15, and 20, the distributed terminal A may identify that a collision has occurred by detecting the collision tone transmitted by the distributed terminal B in the subslots 8 and 15. On the other hand, the distributed terminal B may identify that a collision has occurred by detecting the collision tone in the subslots 2 and 5.

As described in FIG. 4, when the distributed terminal A and distributed terminal B are far apart from each other, even if the distributed terminal A and distributed terminal B use the same subchannel (0, 0), a resource collision does not occur between the distributed terminals A and B. That is, even when the two distributed terminals perform carrier sensing on the subslots associated with each, the collision tone is not detected. However, as shown in FIG. 10A, when the distributed terminal A and distributed terminal B move and become close to each other, a collision may occur in the slot mapped to the subchannel (0, 0). Such the collision may not be detected in the subchannel (0, 0), but, as described above, may be detected in the slat of the resource allocation channel mapped to the subchannel (0, 0).

The control terminal usually does not move, but the control terminal may also move as a kind of distributed terminal. For example, a pilot may control a drone with the control terminal while driving in a car. Considering the situation in which the control terminal moves as described above, the control terminal should also transmit a collision tone and detect a collision tone. The drone and the control terminal share the same mapping slot of the resource allocation channel. That is, the collision tone transmitted h the drone terminal and the pilot terminal is transmitted in the same mapping slot.

As shown in the subchannel configuration of FIG. 1C, resources transmitted by drones and resources transmitted by control terminals are completely separated in time. Accordingly, a communication resource collision may occur between the resources transmitted by drones or between the resources transmitted by control terminals. For various reasons including this reason, it is recommended that collision tones transmitted by the drone terminal and the control terminal are distinguished. This classification may be achieved by, for example, configuring a region for the collision tone transmitted by the drone terminal from the subslot 0 to the subslot 16, and a region of the collision tone transmitted by the control terminal from the subslot 17 to the subslot 32. One such exemplary embodiment is shown in FIG. 10C. The drone terminal may select the subslots 3, 5, and 15 as the subslots in which it transmits the collision tone, and the control terminal controlling the drone terminal may select the subslots 18, 20, and 29 as the subslots in which it transmits the collision tone. Accordingly, in this case, other distributed terminals may clearly distinguish whether the received collision tone is transmitted from the drone or from the control terminal. Here, it is generally assumed that a drone and a control terminal controlling the drone has knowledge on from which subslot the counterpart transmits the collision tone. Therefore, these two distributed terminals may check a resource collision by receiving the collision tones in subslots except the subslots (e.g., 3, 5, 15, 18, 20, and 29) in which they transmit the collision tone.

By continuously monitoring the resource allocation channel as described above, the distributed terminals can identify in real time the communication environments and whether or not resources allocated by them collide. When a collision occurs in a subchannel in use, but the collision is still acceptable because the corresponding resource collision is very small, the distributed terminal such as a drone may continue to perform collision monitoring. Further, if the corresponding resource collision becomes non-acceptable, the distributed terminal may return the resource allocated by itself, and select and allocate another subchannel without resource collision in real time. This operation allows the drone to continue its safe operation.

The present disclosure proposes an additional method to more effectively solve the near-far problem. In an exemplary embodiment, a different transmission power range may be set for each subchannel. As described in FIG. 1C, one control channel having an independent center frequency has 20 subchannels (i.e., communication resources), and thus, one control channel supports 20 distributed terminals (e.g. drones).

In addition, since these 20 subchannels are temporally separated, they may be configured to have different transmission powers. This may solve the near-far problem more effectively.

FIG. 11 is a conceptual diagram for describing configuration of a transmission power range for each subchannel to solve a near-far problem according to an exemplary embodiment of the present disclosure.

As shown in FIG. 11 and Table 1, a transmission power range may be set for each subchannel or each subchannel group. For example, for an arbitrary f, a transmission power range of −10 dBm to −5 dBm is set for subchannels (f, 0) to (f, 3), a transmission power range of 0 dBm to 5 dBm is set for subchannels (f, 4) to (f, 7), a transmission power range of 10 dBm to 15 dBm is set for subchannels (f, 8) to (f, 11), a transmission power range of 20 dBm to 25 dBm is set for subchannels (f, 12) to (f, 15), and a transmission power range of 30 dBm to 35 dBm is set for subchannels (f, 16) to (f, 19). Here, it is generally assumed that the drone uses as low power as possible within the set transmission power range.

In FIG. 11, a configuration example 1110 of transmission power ranges for subchannels and a configuration example 1120 of transmission power ranges for mapping slots corresponding thereto are shown. According to the examples 1110 and 1120, the subchannels (i.e., control channels) and the resource allocation channel may have the same transmission power at the same time. This structure has an effect of minimizing inter-channel interference between the control channel and the resource allocation channel. This is because, if the slots of the control channel and the slots of the resource allocation channel have different transmission powers at the same time, the control channel may have strong interference with the resource allocation channel or the resource allocation channel may have strong interference with the control channel.

In the case that the transmission power ranges are set as described above, the distributed terminal may determine a subchannel to use according to a distance between itself and the control terminal. For example, if the distance between the distributed terminal and the control terminal is within 50 m, one of the subchannels (f, 0) to (f, 3) may be used, and if the distance between the distributed terminal and the control terminal is within 25 m to 200 m, one of the subchannels (f, 4) to (f, 7) may be used, and if the distance between the distributed terminal and the control terminal is within 150 m to 500 m, one of the subchannels (f, 8) to (f, 11) may be used, and if the distance between the distributed terminal and the control terminal is within 350 m to 1500 m, one of the subchannels (f, 12) to (f, 15) may be used, and if the distance between the distributed terminal and the control terminal is within 1000 m to 5000 m, one of the subchannels (f, 16) to (f, 19) may be used.

The above-described transmission power range configuration can solve the signal interference problem due to the near-far problem described in FIG. 2B. In FIG. 2B, the distributed terminal A communicates with the control terminal 210 and the distributed terminal B communicates with the control terminal 220. The control terminal 210 and the control terminal 220 are located at approximately the same position. The distance between the distributed terminal A and the two control terminals 210 and 220 is 1 m, and the distance between the distributed terminal B and the two control terminals 210 and 220 is 400 m. In this case, if the distributed terminal A and distributed terminal B respectively use the subchannel (0, 0) and the subchannel (1, 0), that is, subchannels that are not temporally separated, the signal of the distributed terminal B received at the two control terminal may be smaller than the leakage signal of the distributed terminal A.

Figure 12:
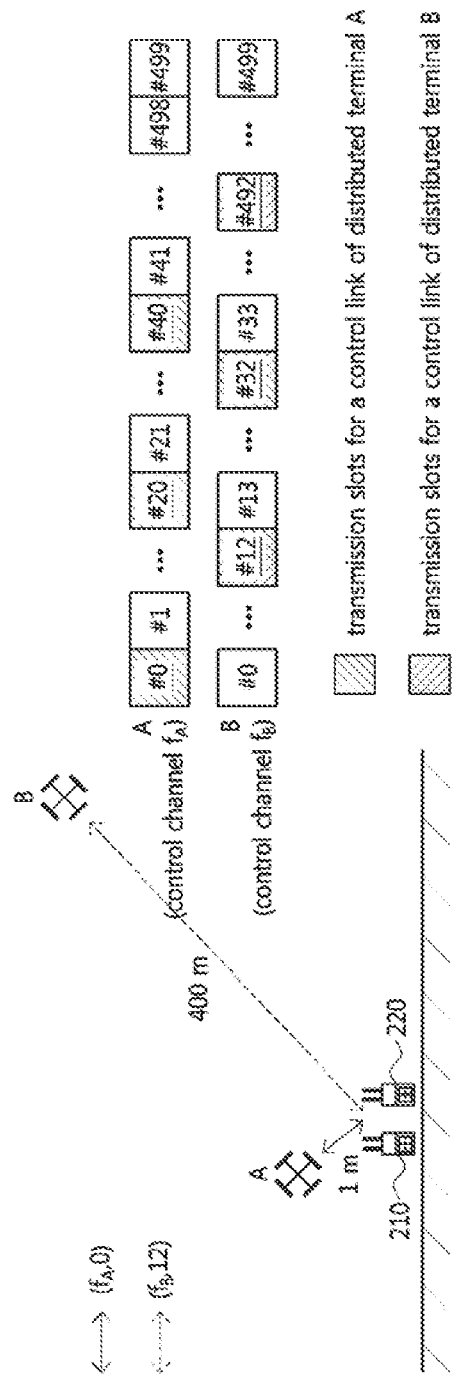
FIG. 12 is a conceptual diagram for describing a method for solving a near-far problem by setting a transmission power range for each subchannel according to an exemplary embodiment of the present disclosure.

FIG. 12 is a conceptual diagram for describing a method for solving a near-far problem by setting a transmission power range for each subchannel according to an exemplary embodiment of the present disclosure.

As shown in FIG. 12, the distributed terminal A uses a subchannel ($f_A$, 0) because the distance from the control terminal 210 is close, and the distributed terminal B uses a subchannel ($f_B$, 12) because the distance from the control terminal 220 is far. Therefore, since the control signals of the distributed terminal A and the distributed terminal B are temporally separated, they are not affected by the near-far problem. This is the same even when the frequency numbers $f_A$ and $f_B$ used by the distributed terminal A and distributed terminal B are the same or different.

If a different transmission power range is set for each subchannel, and the distributed terminal and the control terminal select a resource suitable for each control environment in the above-described manner, the near-far problem can be effectively solved. However, when setting a different transmission power range for each subchannel, a transmission power for a slot of the resource allocation channel mapped with the corresponding subchannel should be set at the same ratio. Since the distributed terminal measures the communication environment through the resource allocation channel, in order to accurately measure the communication environment, the transmission power of the subchannel and the transmission power of the slot of the resource allocation channel mapped to the corresponding subchannel should be increased or decreased together.

For example, if the transmission powers of the subchannel (0,0) and the subchannel (0,4) are set to −10 dBm and 0 dBm, respectively, the transmission powers of the slots 0 and 4 of the resource allocation mapped with them should also be set to −10 dBm and 0 dBm, respectively. In addition, if the transmission powers of the subchannels should be set to be 5 dB higher than the transmission power of the resource allocation channel, the transmission powers of the slots 0 and 4 of the resource allocation channel should be set to −15 dBm and −5 dBm, respectively.

As described above, when the transmission power range is set in advance, the distributed terminal may determine a subchannel for which a permission to use can be received according to a rating assigned to the distributed terminal. For example, if the distributed terminal is a large drone having a rating that can fly within a long distance, the distributed terminal may use all subchannels. On the other hand, if the distributed terminal is a small drone having a rating that can fly within a short distance, the distributed terminal may use only the subchannels having a low transmission power range (e.g., subchannels 0 to 1).

When the available subchannels are limited according to the rating, the distributed terminal may determine available subchannels among the allowed subchannels, calculate mutual interference of the available subchannels, and select subchannels having interference below a predetermined threshold. Alternatively, the distributed terminal may select a predetermined number of subchannels in an order of small interferences. Alternatively, the distributed terminal may select subchannels less than a predetermined number and having interference below a predetermined threshold. Thereafter, the distributed terminal may select one subchannel from among the selected subchannels, perform contention on the subchannel, and transmit data through the subchannel.

Figure 13:
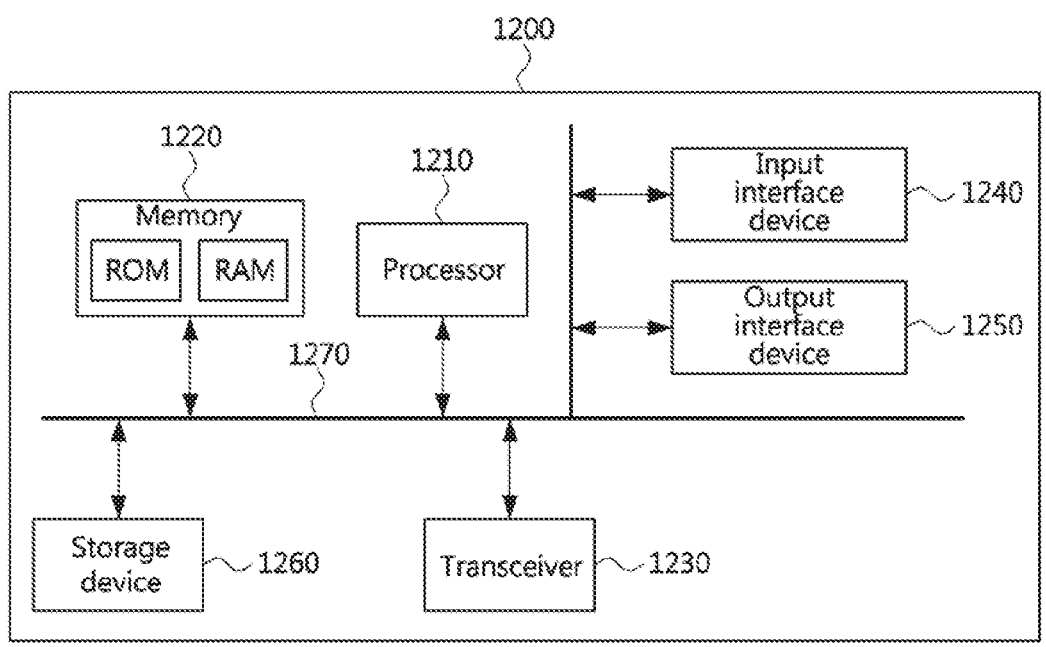
FIG. 13 is a block diagram illustrating a configuration of a distributed terminal according to an exemplary embodiment of the present disclosure.

FIG. 13 is a block diagram illustrating a configuration of a distributed terminal according to an exemplary embodiment of the present disclosure.

The distributed terminal of FIG. 13 may be a distributed terminal (e.g., drone) or a control terminal constituting the synchronized wireless distributed communication system. Referring to FIG. 13, a distributed terminal 1200 may include at least one processor 1210, a memory 1220, and a transceiver 1230 connected to a network to perform communication. In addition, the distributed terminal 1200 may further include an input interface device 1240, an output interface device 1250, a storage device 1260, and the like. The components included in the distributed terminal 1200 may be connected by a bus 1270 to communicate with each other.

However, each component included in the distributed terminal 1200 may be connected to the processor 1210 through a separate interface or a separate bus instead of the common bus 1270. For example, the processor 1210 may be connected to at least one of the memory 1220, the transceiver 1230, the input interface device 1240, the output interface device 1250, and the storage device 1260 through a dedicated interface.

The processor 1210 may execute at least one instruction stored in at least one of the memory 1220 and the storage device 1260. The processor 1210 may refer to a central processing unit (CPU), a graphics processing unit (GPU), or a dedicated processor on which the methods according to the exemplary embodiments of the present disclosure are performed. Each of the memory 1220 and the storage device 1260 may be configured as at least one of a volatile storage medium and a nonvolatile storage medium. For example, the memory 1220 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first distributed terminal, in a synchronized wireless distributed communication system which has a plurality of communication resources configured with a plurality of channels having different center frequencies and includes the first distributed terminal and a second distributed terminal, the operation method comprising:
    receiving slots mapped to the communication resources in a resource allocation channel having a center frequency independent from the plurality of channels;
    measuring communication environments of the communication resources by using a mapping relationship between the received slots of the resource allocation channel and the communication resources;
    selecting a first communication resource to be allocated using the measured communication environments of the communication resources;
    allocating the selected first communication resource; and
    continuously occupying the allocated first communication resource,
    wherein the selecting of the first communication resource comprises:
    identifying unoccupied communication resources among the plurality of communication resources;
    calculating interference power for each of the unoccupied communication resources; and
    selecting the first communication resource based on the calculated interference power for each of the unoccupied communication resources, and
    wherein in the calculating of the interference power, the interference power for each of the unoccupied communication resources is calculated by summing interference powers which all communication resources having different frequencies from and temporally overlapping with the each of the unoccupied communication resources affect the each of the unoccupied communication resources.

2. The operation method according to claim 1, wherein each of the plurality of communication resources is each of the plurality of channels having different center frequencies.

3. The operation method according to claim 1, wherein the plurality of communication resources are a plurality of subchannels into which the plurality of channels having different center frequencies are respectively divided, and the subchannels are temporally separated in each frequency region.

4. The operation method according to claim 3, wherein different transmission power ranges are allocated to temporally separated subchannels among the plurality of communication resources.

5. The operation method according to claim 1, wherein configuration information for the plurality of communication resources, configuration information for the resource allocation channel, and the mapping relationship between the plurality of communication resources and the slots of the resource allocation channel are preconfigured to a plurality of distributed terminals including the first distributed terminal and the second distributed terminal.

6. The operation method according to claim 1, wherein in the identifying of the unoccupied communication resources, the unoccupied communication resources are identified by comparing a received signal strength of a first-in-time subslot of each slot in the resource allocation channel, which is mapped to each of the plurality of communication resources, with a predetermined threshold.

7. The operation method according to claim 1, wherein the interference powers which all communication resources having different frequencies from and temporally overlapping with the each of the unoccupied communication resources affect the each of the unoccupied communication resources are calculated by summing values obtained by adding received signal strengths of slots of the resource allocation channel, which are mapped to the temporally overlapping communication resources, to interference weights according to frequency differences between the temporally overlapping communication resources and the each of the unoccupied communication resources, and the received signal strengths of the slots of the resource allocation channel and the interference weights are expressed in dBm unit and dB unit, respectively.

8. The operation method according to claim 1, wherein the selecting of the first communication resource based on the calculated interference power for each of the unoccupied communication resources comprises:
    determining, by the first distributed terminal, allocable candidate communication resources based on the calculated interference power for each of the unoccupied communication resources;
    receiving, from the second distributed terminal, information on candidate communication resources allocable by the second distributed terminal;
    determining valid candidate communication resources allocable to both the first distributed terminal and the second distributed terminal; and
    selecting the first communication resource from among the valid candidate communication resources.

9. The operation method according to claim 1, wherein in the allocating of the selected first communication resource, the first distributed terminal and the second distributed terminal simultaneously perform allocation contention in a first slot of the resource allocation channel, which is mapped to the selected first communication resource.

10. The operation method according to claim 9, wherein the allocation contention which each of the first distributed terminal and the second distributed terminal performs in the first slot comprises:

selecting, by each of the first distributed terminal and the second distributed terminal, a same first subslot from the first slot composed of a plurality of subslots;

performing, by each of the first distributed terminal and the second distributed terminal, first carrier sensing from a first-in-time subslot to the first subslot of the first slot;

abandoning, by each of the first distributed terminal and the second distributed terminal, the contention when a signal of another terminal is sensed as a result of the first carrier sensing, and starting, by each of the first distributed terminal and the second distributed terminal, signal transmission in the first subslot and selecting a same second subslot when a signal of another terminal is not sensed as the result of the first carrier sensing;

stopping, by each of the first distributed terminal and the second distributed terminal, the signal transmission in the second subslot, and performing, by each of the first distributed terminal and the second distributed terminal, second carrier sensing; and abandoning, by each of the first distributed terminal and the second distributed terminal, the contention when a signal of another terminal is sensed as a result of the second carrier sensing, and assuming, by each of the first distributed terminal and the second distributed terminal, that each of the first distributed terminal and the second distributed terminal has won the contention and resuming signal transmission from a next subslot of the second subslot to a last subslot.

11. The operation method according to claim 1, wherein the continuously occupying of the allocated first communication resource comprises simultaneously transmitting, by the first distributed terminal and the second distributed terminal, a signal of a predetermined level in a first-in-time subslot of a first slot of the resource allocation channel, which is mapped to the allocated first communication resource.

12. The operation method according to claim 11, wherein the predetermined level is determined as a vale obtained by adding a predetermined power to a transmission power of the first communication resource.

13. The operation method according to claim 1, further comprising, after the continuously occupying of the allocated first communication resource, checking a collision of the allocated first communication resource.

14. The operation method according to claim 13, wherein the checking of the collision of the allocated first communication resource comprises:

transmitting, by the first distributed terminal, a collision tone in some subslots of predetermined transmittable subslots except a first-in-time subslot among subslots of a slot of the resource allocation channel, which is mapped to the allocated first communication resource;

transmitting, by the second distributed terminal, a collision tone in some subslots of predetermined transmittable subslots different from a region in which the first distributed terminal transmits a collision tone, except the first-in-time subslot among the subslots of the slot of the resource allocation channel, which is mapped to the allocated first communication resource; and detecting, by the first distributed terminal and the second distributed terminal, a collision tone in subslots where neither of the first distributed terminal and the second distributed terminal transmits a collision tone, in the slot of the resource allocation channel, which is mapped to the allocated first communication resource.

15. The operation method according to claim 13, further comprising, when a resource collision is determined in the checking of the collision of the allocated first communication resource, determining whether to allow the resource collision; and in response to determining not to allow the resource collision, returning the first communication resource.

* * * * *